Dec. 24, 1968  J. M. MANDULA ETAL  3,418,567
MAGNETIC FLAW DETECTOR SYSTEM WITH MARKING FLUID
APPLICATOR OPERABLE BY VARIABLE
PRESSURE OF A CONTROL FLUID
Filed June 14, 1963  2 Sheets-Sheet 1

INVENTORS.
JOSEPH M. MANDULA
BY TYLER W. JUDD
GEORGE J. SKIPPER
Watts & Fisher
ATTORNEYS.

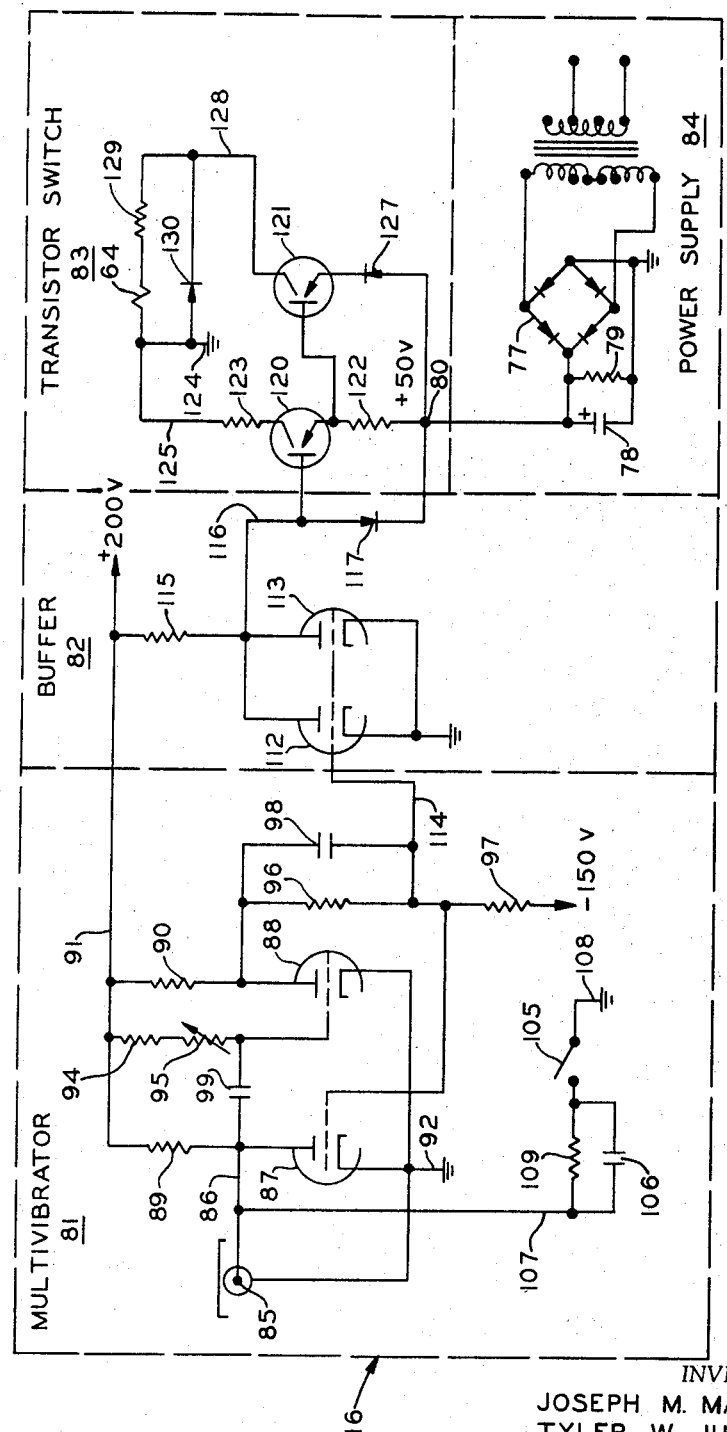

United States Patent Office 3,418,567
Patented Dec. 24, 1968

3,418,567
MAGNETIC FLOW DETECTOR SYSTEM WITH MARKING FLUID APPLICATOR OPERABLE BY VARIABLE PRESSURE OF A CONTROL FLUID
Joseph M. Mandula, Cleveland, Tyler W. Judd, Chardon, and George J. Skipper, Cleveland, Ohio, assignors to Republic Steel Corporation, Cleveland, Ohio, a corporation of New Jersey
Filed June 14, 1963, Ser. No. 287,987
5 Claims. (Cl. 324—37)

The present invention relates generally to non-destructive inspection of workpieces for defects and flaws and more specifically to systems for marking the locations of the defects and flaws detected.

In the manufacture of pipes, rods, bars, billets and other workpieces, it is desirable that the location of seams and other defects be determined and marked to facilitate conditioning of the workpieces. The workpieces are conditioned by chipping or scarfing out the defect usually some time after the inspection process. To facilitate this conditioning process it is desirable that the locations of the defects be accurately indicated by a readily visible and fairly permanent mark.

The present invention provides an apparatus for marking the locations of defects with a brightly colored paint so that the mark is readily visible at the time of conditioning and will last until the time of conditioning. Further, the present marking apparatus is extremely fast acting so that the location of the defect is quickly and accurately marked after being detected by suitable defect detection equipment. This fast-acting operation of the present apparatus enables it to be mounted next to the detection equipment which, in the case of large workpieces as for example billets, must reciprocate transversely across a longitudinally moving workpiece.

In the present high speed marking apparatus a paint marker or applicator is provided wherein the paint supply is maintained under pressure at an orifice opening at all times so that a paint mark is sprayed immediately upon activation of the paint applicator. The orifice is normally closed to the paint supply by a needle valve pressed by air pressure greater than the paint pressure against a valve seat surrounding the orifice. During the time the paint applicator is inactivated, i.e., the air pressure is greater than the paint pressure, air is continually flowing through the orifice to prevent clogging. When the air pessure drops to blow the paint supply pressure, the needle valve is moved away from the orifice opening and a pain mark is immediately sprayed. Control of the air pressure, and thus control of the activation of the paint applicator, is through a suitable solenoid operated air valve. The solenoid air valve is operated by a control circuit which energizes the solenoid with a control pulse the instant it receives a defect signal pulse from the defect detection equipment scanning the moving workpiece.

Several aspects of the control circuit of the present invention contribute to the instant activation of the air valve. First, a "constant current" operation is used to increase the speed of activation of the air valve. The constant current operation provides a ten-fold increase in the speed of activation of the air valve as compared to conventional operations. This "constant current" operation is accomplished by employing a high supply voltage and reducing the current energizing the solenoid coil. Another important aspect of the present control circuit is the joining of an electronic timer circuit with a transistor switching circuit by a buffer circuit in an arrangement which causes the transistor circuit to energize the solenoid coil the instant the timer circuit receives the defect signal pulse from the defect detection equipment.

An important advantage of the present high-speed marking apparatus is that the present paint applicator is light-weight and requires little space. It is easily mounted next to a search probe used in the defect detection equipment so that it reciprocates with the probe to mark the transverse position as well as the longitudinal position of a defect in a longitudinally moving workpiece. Further, the present marking system is extremely fast in operation. Even though the paint applicator is reciprocating with the probe across the longitudinally moving workpiece, the paint applicator is capable of marking the locations of defects with round spots at least ½-inch in diameter with great intensity so as to be readily seen. This painted spot accurately pinpoints the transverse and longitudinal coordinates of the defect and is not limited to merely making lines which indicate the location of the defect by a single coordinate.

The present invention will be better understood by those skilled in the art by reference to the drawings which accompany and form a part of this specification and in which:

FIGURE 3 is a circuit diagram of the control system for the high speed marking apparatus of FIGURE 1.

Figure 1:
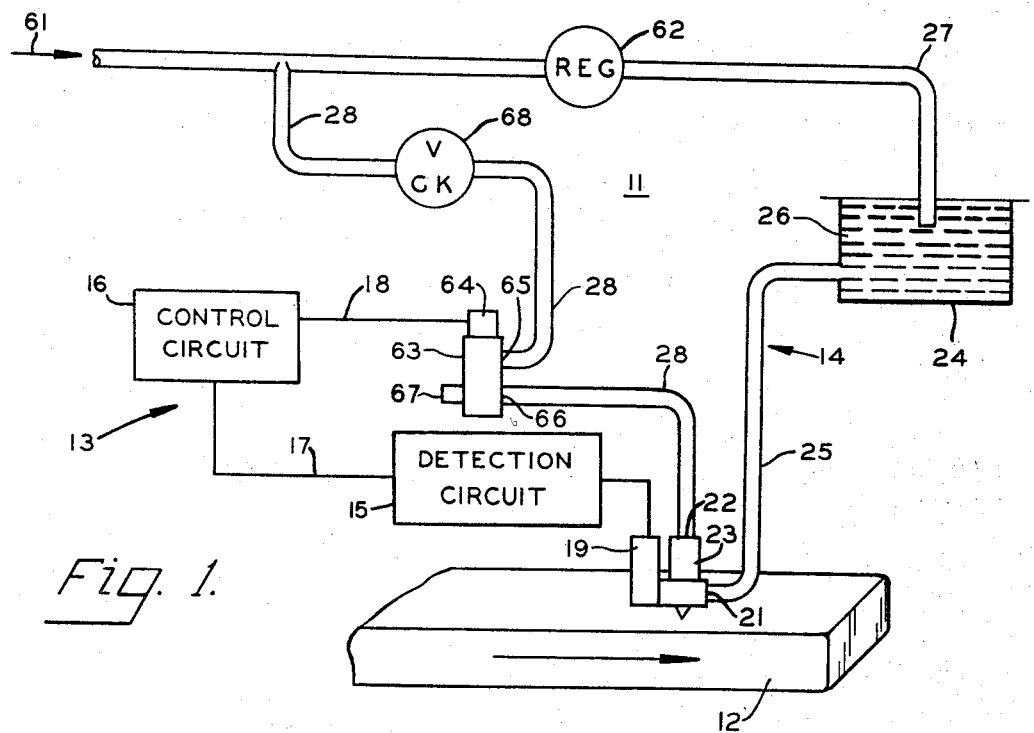
FIGURE 1 is a schematic diagram of the high speed marking apparatus of the present invention.

Referring now to the drawings, a preferred form of the high speed marking system of the present invention is indicated generally by the reference character 11. In the high speed marking system 11, defects in a longitudinally moving workpiece 12 are detected and marked with a paint mark which is preferably about ½-inch in diameter. Where the workpiece 12 is a billet or other like workpiece having broad surface areas, two or more high speed marking systems 11 are used to inspect and mark defects on each of the billet surfaces.

The high speed marking system has an electrical section 13 and a pneumatic section 14. The electrical section 13 produces a control signal whenever it detects a defect in the moving workpiece 12. This control signal is introduced to the pneumatic section 14 and the pneumatic section 14 sprays a small paint mark of high intensity on the workpiece at the location of the defect.

The electrical section 13 includes a defect detection circuit 15 for determining the presence of defects in the workpiece 12 and producing a defect signal for each defect detected. This defect signal is introduced to the input terminals of a control circuit 16 via a conductor 17. The control circuit 16 produces and introduces a timed control pulse to the pneumatic section 14 via a conductor 18 the instant it receives a defect signal at its input. The control pulse then activates the pneumatic section 14 to mark the moving workpiece 12 at the location of the defect.

One suitable form of the defect detection system 15 is a seam depth indicator which is explained in U.S. Patent No. 2,914,726, issued to W. C. Harmon. The seam depth indicator inspects for defects by the generation of eddy currents in the workpiece. When the current attempts to traverse a seam or other defect, the resistance of the defect causes a change in the phase angle and other characteristics of the current. At least one of these current changes is sensed by a search probe 19.

Suitable apparatus (not shown) is provided to rapidly reciprocate the search probe 19 across the workpiece 12 in a direction transverse to its longitudinal movement. With the workpiece 12 moving longitudinally past the reciprocating search probe 19, the motion of the search probe 19 relative to the surface of the workpiece 12 is in a path which is generally sawtooth in shape.

The pneumatic section 14 includes a paint applicator or marker 23 which is mounted behind the search probe 19 and reciprocates with it across the broad surface of the longitudinally moving workpiece 12. The paint applicator 23 is supplied at an inlet paint port 21 with paint from a pressurized paint reservoir 24 through a paint supply conduit 25. The paint reservoir 24 contains a supply of paint 26 which is maintained under pressure by air introduced through a reservoir air supply conduit 27. Air is introduced into an inlet air port 22 of the paint marker 23 through an applicator control conduit 28. As will be described in greater detail below, the operation of the paint applicator 23 is such that whenever the pressure of the air supplied through the applicator control conduit 28 together with the pressure of a spring is greater than the pressure of the paint supplied through the paint supply conduit 25, the paint applicator 23 does not spray a paint mark. If, however, the pressure of the spring plus the air supplied through the applicator control conduit 28 drops to below the pressure of the paint in the paint supply conduit 25, the paint applicator 23 is activated to spray a paint mark on the workpiece 12.

For convenience, the balance of the specification will be separated into four sections:

I. The Paint Applicator 23.
II. The Pnuematic Section 14.
III. The Electrical Section 13.
IV. Summary.

Figure 2:
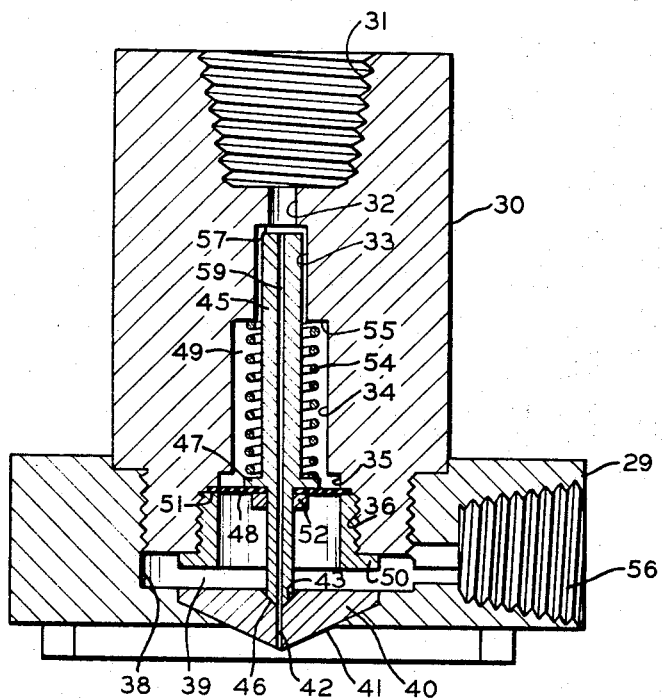
FIGURE 2 is an elevational view, in cross-section of a preferred form of a paint applicator employed in the high-speed marking apparatus shown in FIGURE 1.

*I. The paint applicator 23 (FIGURE 2)*

The paint applicator 23 has a body composed of paint and air sections 29, 30. The air section 30 is a relatively elongated annular body having a through axial passage. The axial passage is defined by a threaded inlet opening 31 for connection to the air supply conduit 28 and a stepped bore exending from this connection opening 31 through to the opposite end of the air section 30. The stepped bore in the air section 30 is composed of a small diameter connecting section 32, a valve member positioning section 33, a valve member biasing section 34, a diaphragm control section 35 and an internally threaded clamp ring section 36 adjacent the lower end of the air section 30. The sections 32, 33, 34, 35, 36 are contiguous and of increasing diameter in the mentioned order.

The paint section 29 has an axial bottomed bore 38 into which the air section 30 is threaded. The perimeter of the bottomed bore 38 defines the extremities of a paint cavity 39. The lower extremity of this paint cavity 39 is defined by an annular applicator head member 40 which is fixed to the paint section 29. The applicator head 40 has an outer conical surface 41 which is an axial alignment with a through axially disposed fluid outlet 42. The applicator head 40 has a conical seat portion 43 formed at the inner end of the fluid outlet 42.

A valve member 45 is positioned in and along the axis of the passage in the air section 30. The valve member 45 has a lower seating surface 46 which abuts against and coacts with the valve seat 43 in the spray head 40. The stem of the valve member 45 has a radially extending annular flange 47 located within the diaphragm control section 35 of the passage in the air section 30. An annular diaphragm 48 abuts the flange 47 and extends radially outwardly from the valve member 45 to the walls of the through passage. The valve member 45 and the diaphragm 48 cooperate to define a flexible fluid restraining wall extending across the air section passage. The portion of the air section passage above the diaphragm 48 as viewed in FIGURE 2, forms an air chamber 49 while the portion of this passage below the diaphragm 48 communicates with and forms a part of the paint chamber 39.

To effect the flexible wall between these two chambers 39, 49, the diaphragm 48 is sealed near its perimeter to the air section and near its central opening to the valve stem. The seal at the diaphragm perimeter is effected by a diaphragm clamping ring 50 which is threaded into the passage threaded section 36 clamping the diaphragm against a shoulder 51 extending radially outwardly from the lower end of the diaphragm control section 35. The seal of the diaphragm 48 to the valve stem is effected by a clamping ring 52 which is secured to the valve member 45 pressing the diaphragm 48 against the flange 47. A coil spring 54 surrounds the valve member 45 and is positioned in the air chamber 49. The spring 54 extends upwardly from the flange 47 to abut a radially extending annular shoulder 55 which connects the positioning and biasing passage sections 33, 34.

During operation, air is maintained within the air chamber 49, acting downwardly against the diaphragm 48 at all times except when paint is to be applied. The pressure of this air acting downwardly on the diaphragm 48 together with the pressure of the surrounding spring 54 maintains the member seating surface 46 in sealing engagement with the valve seat 43. Paint supplied through an inlet opening 56 is maintained under pressure in the paint chamber 39. When the air is released from the air chamber 49 in a manner which will be described in greater detail below, the pressure of the paint in the chamber 39 acting against the diaphragm 48 overcomes the pressure of the coil spring 54 and lifts the seating surface 46 out of engagement with the valve seat 43. The valve member 45 is moved axially away from the seat 43 until it strikes a shoulder 57 extending radially from the connecting section 32 to the positioning section 33. This opens the valve allowing the paint under pressure to flow through the fluid outlet 42.

As soon as air under pressure is returned to the air chamber 49, the seating surface 46 is returned to closing engagement with the valve seat 43. Air bleeding through a valve stem axial bore 59 is directed outwardly through the fluid outlet 42 when the valve is closed. This bleeding air drives any residual paint from the fluid outlet 42 maintaining it open and preventing clogging during periods of time when paint is not being applied.

It is to be noted that the paint chamber 39 formed within the applicator body forms a small auxiliary reservoir which holds a substantial quantity of paint at and immediately surrounding the fluid outlet 42. This substantial reservoir of paint assures that paint will immediately flow through the fluid outlet 42 upon lifting of the valve member. Moreover, the paint need only travel the length of the fluid outlet 42 before it is free to spray and mark. In addition the flow of air through the bleed passage 59 stops when the fluid outlet 42 is opened so that only paint flows through the outlet 42 to make a high intensity mark.

The structure thus defined has paint under pressure available immediately adjacent the paint application outlet at all times. Instantaneous opening of the paint outlet is obtained by the simple expedient of relieving air pressure and allowing it to escape from the chamber 49. Substantially instantaneous response to a signal indicating a detected flaw, then, is obtained. At the same time the novel construction provides a paint applicator in which clogging of the paint outlet is completely eliminated.

*II. The pneumatic section 14 (FIGURE 1)*

A common air source 61 (not shown) supplies air to both the paint reservoir 24 and the paint applicator 23. A pressure regulator 62 is provided in the reservoir supply conduit 27 between the paint reservoir 24 and the applicator control conduit 28 to reduce the pressure of the air supplied to the paint reservoir 24 in relation to the pressure of the air supplied to the paint applicator 23. This maintains the valve member 45 normally against the valve seat 43 and closes the fluid outlet 42.

A three-way, solenoid-actuated, normally-open control valve 63 is provided in the applicator control conduit 28 between the paint applicator 23 and the air source 61 to control the flow of air to the paint applicator 23 in response to control signals from the control circuit 16. The control valve 63 includes an electrical solenoid 64 which is connected to the conductor 18 and is energized by control signals produced by the control circuit 16. The control valve 63 further includes an inlet port 65 receiving air from the air source 61, an outlet port 66 supplying air to the paint applicator 23, and an exhaust port 67.

The valve inlet port 65 is normally directly connected within the control valve 63 to the outlet port 66 so that air under pressure is supplied to the paint applicator 23 when no control signal is introduced to the solenoid 64. When a defect is detected and a control signal energizes the solenoid coil 64, the control valve 63 is activated to disconnect the inlet port 65 from the outlet port 66 and connect the outlet port 66 to the exhaust port 67. The air pressure in the paint applicator 23 then exhausts to the atmosphere so that the paint pressure opens the applicator in a manner described below and the paint applicator operates to make a paint mark.

An air check valve 68 is provided in the applicator conduit 28 between the air source 61 and the air valve 63. The check valve 68 prevents the leakage of air from the paint applicator 23 when the air source 61 is disconnected. This maintains the applicator in an off position until the paint reservoir is returned to atmospheric pressure when the system is shut down or when the air supply fails.

When the paint applicator 23 is connected into the pneumatic section 14 as is shown in FIGURE 1, paint and air enter through their respective ports 21, 22 and fill the paint and air chambers 39, 49 respectively. Since the valve stem 45 is rigidly secured to the diaphragm 48, any flexure of the diaphragm 48 due to a differential in pressure on either side causes the valve stem 45 to move axially within the air section 30 toward the chamber having the lower pressure. Since the air pressure is normally greater than the paint pressure when no defect is detected, the diaphragm 48 is normally flexed toward the valve seat 43 and forces the valve member 45 to press against the valve seat 43. The valve member 45 then blocks communication between the orifice or outlet 42 and the paint chamber 39 and prevents paint from flowing through the fluid outlet 42. At the same time, the air brought in through port 22 flows through the very small bleed passage 59 in the center of the valve member 45 and then out through the outlet 42. The bleed passage or bore 59 in the valve member 45 is very small so that there is no appreciable drop in the pressure exerted against the top of the diaphragm 48.

When a defect is detected and a control signal energizes the solenoid 64, the control valve 63 shifts from its normally-open position to a closed position connecting the outlet port 66 to the exhaust port 67 and exhausts the air chamber 49 of the paint applicator 23 to the atmosphere. The paint chamber 39 is now at a higher pressure than the air chamber 49 and forces the diaphragm 48 to flex upwardly moving the valve member 45 away from the valve seat 43. The paint then flows under pressure through the fluid outlet 42 and sprays a mark on the workpiece 12. The paint continues to flow through the fluid outlet 42 to intensify the mark on the workpiece until the control signal ceases whereupon the solenoid 64 of the air valve 63 is de-energized to again connect the paint applicator 23 to the air supply 61. This restores air pressure in the air chamber 49 and stops the flow of paint through the outlet 42.

III. *The electrical section 13*

The control circuit 16 of the electrical section 13 provides substantially instant activation of the air valve 63 in response to a defect signal from the defect detection circuit 15. This rapid activation of the air valve assures that the applicator 23 will accurately mark the transverse and longitudinal positions of the defect in the moving workpiece 12.

As shown in FIGURE 3, the control circuit 16 includes a monostable multivibrator section 81, a buffer section 82, a transistor switching section 83, and a power supply section 84. The multivibrator section 81 causes the transistor switching section 83 to energize the solenoid 64 for a predetermined "on-time" which is independent of the duration or amplitude of the defect signal produced by the defect detector circuit 15. The buffer section 82 isolates the multivibrator section 81 from the remainder of the control circuit and assures high stability in the multivibrator section 81. The transistor switching section 83 energizes the solenoid coil 64 the instant that a defect signal is received by the multivibrator section 81. The power supply section 84 provides a 50 v. positive supply voltage to the transistor switching section 83 at the juncture point 80 from a bridge rectifier 77 having a capacitive filter 78 and a bleed resistor 79.

The multivibrator section 81 comprises an input terminal 85 which receives the negative-going defect signal from the defect detection circuit 15 via the conductor 17. The input terminal 85 is connected via a conductor 86 to the plate of a vacuum tube section 87 which is one of a pair of vacuum tube sections 87, 88 which are connected as a conventional plate-coupled, monostable multivibrator. The plates of both tube sections 87, 88 are connected to a 200 v. positive supply via load resistors 89, 90 and a conductor 91. The cathodes of both tube sections 87, 88 are connected to a ground connection 92. A resistor 94 and a timing potentiometer 95 connect the grid of the tube section 88 to the conductor 91 and render the tube section 88 normally conducting. The tube section 87 is normally held below cutoff by the connection of its grid to a voltage divider formed by resistors 96, 97 which are connected between the plate of the tube section 88 and a 150 v. negative supply. A capacitor 98 is connected in parallel to the resistor 96 as a "speed-up" capacitor and compensates for shunt capacities in the tube sections and the conductor leads.

When a negative defect pulse is applied to the plate of the tube section 87 it is coupled to the grid of the tube section 88 through a capacitor 99. This causes cutoff of the tube section 88 and initiates the switching action of the multivibrator 81. The tube section 88 remain cut off for a period determined by the time required for discharge of the capacitor 99 through the resistor 94 and the potentiometer 95. The "on-time" period of the multivibrator section 81 determines the period of energization of the solenoid 64 and hence the size of the mark made by the paint appliactor 23. The "on-time" period selected by the potentiometer is related and coordinated to the longitudinal speed of the workpiece so that a full intensity paint spot is sprayed without causing the paint to be spread out in a line.

The switching action of the multivibrator section 81 may be also initiated by contacts, or other suitable means, external to the circuit. As shown in FIGURE 3, a pushbutton switch 105 and a capacitor 106 are connected in series in a conductor 107 which connects the plate of the tube section 87 to a ground connection 108. Closing the pushbutton switch 105 grounds the plate of tube section 87 to ground through the capacitor 106. A resistor 109 is connected in parallel to the capacitor 106 to provide a discharge path for the capacitor 106 when the pushbutton switch 105 is opened. The testing switch 105 is preferably located on a control panel (not shown) and provides a convenient means of testing the operation of the marking system 11.

The buffer section 82 includes a pair of vacuum tube sections 112, 113 connected in parallel and having their grids connected to the voltage divider formed by the resistors 96, 97 via a conductor 114. The tube sections 112, 113 are normally cut off due to the voltage divider action of the resistors 96, 97. The plates of the vacuum tube section 112, 113 are connected through a resistor 115 to the 200 v. positive voltage supply. A conductor 116 containing a forward biased diode 117 connects the plates of the tube sections 112, 113 to the 50 v. positive voltage point 80. Since the tube sections 112, 113 are normally cut off, the voltage at their plate is clamped to the 50 v. positive voltage point 80 because of the action of the diode 117 and of the resistor 115. During the "on-time" timing period of the multivibrator section 81, the bias for the grids of tube sections 112, 113 in the buffer section 82 is zero and the tube sections 112, 113 conduct heavily. Conduction of the tube sections 112, 113 reduces the voltage at their plates nearly to zero. This reverse biases the diode 117 so that it does not now conduct. As will be seen in greater detail below, it is the conduction or lack of conduction of the diode 117 which activates the transistor switching section 83 between "off" and "on" states.

The transistor switching section 83 includes an initiating transistor 120 and a power switching transistor 121. The base of the transistor 120 is connected to the conductor 116. The emitter of the transistor 120 is connected through a resistor 122 to the 50 v. positive voltage point 80. The collector of the transistor 120 is connected through a resistor 123 to a ground connection 124 via a conductor 125.

The power switching transistor 121 has its base connected to the emitter of the transistor 120. The emitter of the power switching transistor 121 is connected through a diode 127 to the 50 v. positive voltage point. The power switching transistor 121 is normally close to cut-off because of the diode 127 connected in series with its emitter. Any voltage drop across the diode 127 provides a reverse bias which will oppose additional current flow. Thus, for all practical purposes, the transistor 121 is normally an open circuit when no defect has been detected.

The collector of the transistor 121 is connected through the solenoid coil 64 of the air valve 63 to the ground connection 124 via resistor 129 and a conductor 128. A diode 130 is connected from the collector of transistor 121 to the ground connection 124 to limit switching transients which might otherwise damage the transistor 121.

The 75 ohm dropping resistor 129 connected in series with the coil 64 makes the resistance of the voltage source for the solenoid coil 64 appear large in relation to the resistance of the solenoid coil. This arrangement provides the "constant current" operation required to achieve fast-acting operation from most conventional solenoid, operated air valves. By supplying a relatively high voltage to the solenoid coil and reducing the current by means of the resistor 129 in series with the solenoid coil 64, the effect of the solenoid inductance is nullified and hence reduces the time required for actuation of the air valve.

As was described, when no defect is detected and no timed control pulse is produced by the multivibrator section 81, the diode 117 is forward biased and conducts so that there is a small voltage drop across it on the order of approximately .6 volt. This small voltage drop reverse biases the emitter-base circuit of the transistor 120 so that the transistor 120 is cut off. When a defect is detected and the multivibrator section 81 is producing the timed "on-time" control signal, the diode 117 does not conduct and a relatively large current can then flow through the base circuit of the transistor 120 via the plate resistance of the tube sections 112, 113 and the resistor 122. This heavy current conduction causes the transistor 120 to saturate permitting base current to flow through the power switching transistor 121 via the diode 127, the emitter-collector resistance of transistor 120, and the resistor 123. Sufficient base current is allowed to flow through the base circuit of transistor 121 to assure its complete saturation. When saturated, transistor 121 provides a very low resistance path between its emitter and collector which connects the solenoid coil 64 in circuit with the power supply 84 and activates the solenoid air valve 63. The energization of the solenoid coil 64 occurs substantially the instant a defect triggering signal is received by the tube section 87 in the multivibrator 81 and continues for the "on-time" period selected in the multivibrator 81.

*IV. Summary*

In summary, the present high speed marking system comprises a paint applicator having a paint outlet normally closed by a valve biased by a supply of fluid under pressure, a supply of paint maintained under pressure at the outlet, the valve being urged from its closing position by the paint pressure but being held in its outlet closing position by a predetermined relation in paint and fluid pressures, a fluid control valve regulating the pressure of at least one of the supplies, and a flaw detection system connected to the fluid control valve and responsive to a flaw in a workpiece to actuate the control valve and change the pressure of the supply to alter the predetermined pressure relation such that the paint pressure moves the valve from its closing postion and a paint mark is sprayed. The invention further involves a bleed passage through the valve so fluid flows through the paint outlet when the outlet is closed to the paint supply. Finally, the present invention contemplates a timer circuit interposed between the fluid control valve and the flaw detection system to preselect the duration of each mark sprayed. Where the fluid control valve is solenoid actuated a resistor is connected in series circuit with the solenoid coil and is sized to reduce the circuit current while maintaining substantially full supply voltage across the solenoid coil.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A flaw marking system for marking flaws detected in a longitudinally moving workpiece, the system comprising:
    (a) a marking fluid applicator connected to receive a marking fluid and a regulating fluid and release said marking fluid onto said workpiece in response to variation in pressure of said regulating fluid provided to said applicator;
    (b) a solenoid for controlling said pressure of said regulating fluid provided to said applicator;
    (c) a transistor having base, emitter, and collector elements, the solenoid and a power source being connected in series with the emitter and collector elements;
    (d) a resistance connected in series with said solenoid;
    (e) initiating circuit means normally biasing the emitter-base circuit of said transistor to render said transistor in a normally-unsaturated state, said initiating circuit means being responsive to a control pulse to cause said transistor to saturate and effectively close its emitter-collector circuit;
    (f) a multivibrator circuit having an input terminal and having an output terminal, the latter terminal being connected to said initiating circuit means, said output terminal producing a control pulse of preselected duration for each defect signal received at said input terminal;
    (g) a flaw detector mounted adjacent the path of workpiece travel; and
    (h) said flaw detector having an output terminal connected to the input terminal of the multivibrator and producing a defect signal at its output terminal in response to a flaw in the workpiece.

2. The device of claim 1 wherein:

(a) a buffer circuit is interposed between said initiating circuit and said multivibrator circuit to isolate said multivibrator circuit from the initiating circuit and the transistor.

3. The device of claim 1 wherein:
(a) said flaw detector is mounted adjacent the applicator.

4. In a flaw detection mechanism a flaw marking system comprising:
(a) a marking fluid applicator having:
 (i) a body defining internal, axially aligned, pressure chambers;
 (ii) one of said chambers being a marking fluid chamber and the other a regulating fluid chamber;
 (iii) said body defining a marking fluid inlet port, an outlet port axially aligned with the chambers and a seat circumscribing the outlet;
 (iv) an axially disposed tubular valve stem reciprocally mounted in the chambers and shiftable from a closed position abutting the seat and preventing the emission of marking fluid to an open position permitting the emission of marking fluid;
 (v) an annular flexible diaphragm mounted between the chambers and secured to the valve stem, the stem and diaphragm together forming a flexible partition between the chambers;
 (vi) said body defining a regulating fluid inlet port communicating with the other of said chambers for connection to a supply of regulating fluid under pressure to maintain regulating fluid under pressure in said other chamber to act against the diaphragm and maintain the valve in said closed position; and,
 (vi) said stem having a through regulating fluid bleed passage extending from one end of the stem to the other to conduct regulating fluid from said other chamber to the outlet when the valve is in the closed position;
(b) marking fluid supply means connected to said marking fluid inlet port for supplying marking fluid fluid under pressure to the marking fluid chamber and acting against the diaphragm to move said stem to an open position when the regulating fluid pressure is reduced relative to the marking fluid pressure;
(c) a solenoid operated control valve interposed between the regulating inlet port and the supply of regulating fluid to control the pressure of the regulating fluid acting on said diaphragm;
(d) a transistor having base, emitter, and collector elements, the solenoid and a power source being connected in series circuit with the emitter and collector elements;
(e) a resistance connected in series with said solenoid to reduce the current in the series circuit;
(f) initiating circuit means normally biasing the emitter-base circuit of said transistor to render said transistor in a normally unsaturated state, said initiating circuit means being responsive to a control pulse to cause said transistor to saturate and effectively close its emitter-collector circuit;
(g) a multivibrator circuit having an input terminal and having an output terminal, the latter terminal being connected to said initiating circuit means, said output terminal producing a control pulse of preselected duration for each defect signal received at said input terminal; and,
(h) said flaw detector mechanism having an output terminal connected to the input terminal of the multivibrator and producing a defect signal at its output terminal in response to a flaw in the workpiece whereby said solenoid is activated to reduce the regulating fluid pressure relative to the marking fluid pressure.

5. The mechanism of claim 4 including:
(i) a spring disposed in said other chamber and against said valve stem for normally biasing the stem to a closed position when no pressures are acting against said diaphragm; and,
(j) the force of the spring acting against said valve stem is less than the pressure of the marking fluid supply means acting against said diaphragm.

References Cited

UNITED STATES PATENTS

| | | | |
|---|---|---|---|
| 1,332,544 | 3/1920 | Davis | 239—411 |
| 2,728,196 | 12/1955 | Bowser | 222—61 |
| 3,249,861 | 5/1966 | Pevar | 324—37 |
| 1,791,570 | 2/1931 | Orton et al. | 251—25 |
| 1,801,328 | 4/1931 | Burrows | 324—37 |
| 1,847,343 | 3/1932 | Jackson | 251—25 |
| 2,069,030 | 1/1937 | Drake | 324—37 |
| 2,103,851 | 12/1937 | Jones et al. | 324—37 |
| 2,133,687 | 10/1938 | Drake | 324—37 |
| 2,864,649 | 12/1958 | Adams | 239—533 |
| 2,884,592 | 4/1959 | Wilson | 324—37 |
| 2,889,514 | 6/1959 | Cowan et al. | 324—37 |
| 3,053,461 | 9/1962 | Inglis | 239—533 |
| 3,180,230 | 4/1965 | Judd et al. | 239—533 |

OTHER REFERENCES

Transistor Pulse Amplifiers Detect Rail Faults, by Keevil; Electronics, May 25, 1962, pp. 53, 54.

ARCHIE R. BORCHELT, *Primary Examiner.*

R. J. CORCORAN, *Assistant Examiner.*

U.S. Cl. X.R.

222—4, 61; 239—410